United States Patent
Darvas et al.

(10) Patent No.: US 8,152,974 B2
(45) Date of Patent: Apr. 10, 2012

(54) ELECTRODE FOR ELECTROCHEMICAL CELL OPERATING WITH HIGH DIFFERENTIAL PRESSURE DIFFERENCE, PROCEDURE FOR THE MANUFACTURING OF SUCH ELECTRODE AND ELECTROCHEMICAL CELL FOR THE USE OF SUCH ELECTRODE

(75) Inventors: Ferenc Darvas, Budapest (HU); Dániel Szalay, Budapest (HU); Lajos Gödörházy, Érd (HU)

(73) Assignee: ThalesNano Zrt., Budapest (HU)

( * ) Notice: Subject to any disclaimer, the term of this patent is extended or adjusted under 35 U.S.C. 154(b) by 606 days.

(21) Appl. No.: 12/086,970

(22) PCT Filed: Dec. 22, 2006

(86) PCT No.: PCT/HU2006/000124
§ 371 (c)(1),
(2), (4) Date: Nov. 6, 2008

(87) PCT Pub. No.: WO2007/072096
PCT Pub. Date: Jun. 28, 2007

(65) Prior Publication Data
US 2009/0242391 A1    Oct. 1, 2009

(30) Foreign Application Priority Data
Dec. 23, 2005 (HU) .................... 0501201

(51) Int. Cl.
*C25B 9/02* (2006.01)
*C25B 9/06* (2006.01)
*C25B 9/08* (2006.01)
*C25B 9/10* (2006.01)

(52) U.S. Cl. ............. 204/252; 204/280; 204/283

(58) Field of Classification Search ........... 204/252, 204/280, 283; 429/479, 480, 481, 482, 483, 429/507, 508, 523, 529, 532, 533, 534, 535
See application file for complete search history.

(56) References Cited

U.S. PATENT DOCUMENTS

| 6,685,806 | B1* | 2/2004 | Cadaval Fernandez De Leceta et al. ................. 204/283 |
| 7,070,879 | B2* | 7/2006 | Mardilovich et al. ....... 429/481 |
| 2005/0089739 | A1* | 4/2005 | Seccombe et al. ........... 429/30 |
| 2005/0250003 | A1* | 11/2005 | Zagaja et al. ............. 429/45 |
| 2005/0263393 | A1* | 12/2005 | Paz ......................... 204/400 |

FOREIGN PATENT DOCUMENTS
EP    1267433    * 12/2002
* cited by examiner

*Primary Examiner* — Bruce Bell
(74) *Attorney, Agent, or Firm* — Olson & Cepuritis, Ltd.

(57) ABSTRACT

The invention relates to a porous electrode used in an electrochemical cell, containing a carrier and/or catalytic agent, which is characterized by that it consists of two or more layers with different average pore sizes, out of which layers the contact layer with the smallest average pore size is in contact with the membrane, and one or more supporting layers with a greater average pore size are linked to the other side of this contact layer. Furthermore, the invention relates to a procedure for the manufacturing of such electrodes and to electrochemical cells containing such electrodes.

4 Claims, 3 Drawing Sheets

Figure 1:
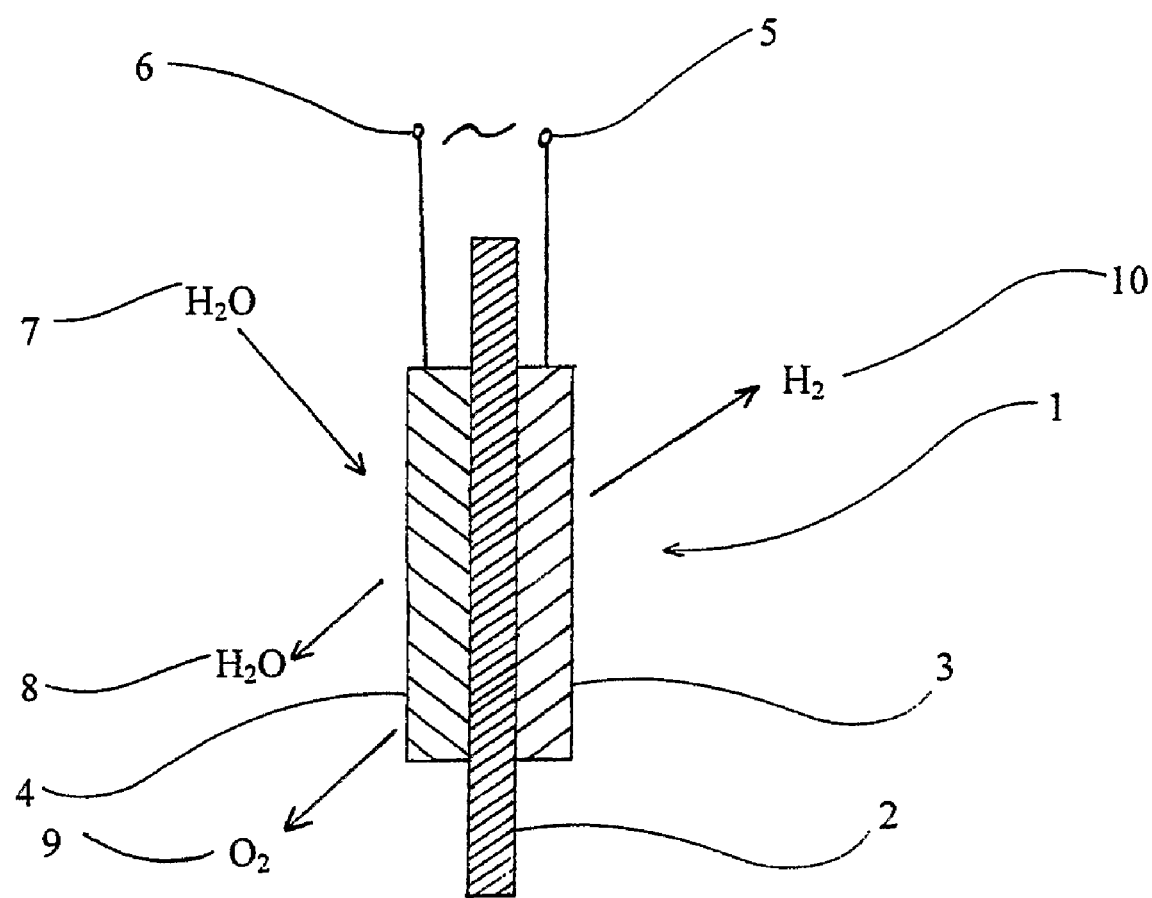

ELECTRODE FOR ELECTROCHEMICAL CELL OPERATING WITH HIGH DIFFERENTIAL PRESSURE DIFFERENCE, PROCEDURE FOR THE MANUFACTURING OF SUCH ELECTRODE AND ELECTROCHEMICAL CELL FOR THE USE OF SUCH ELECTRODE

The present invention relates to an electrode that can be used in electrochemical cells operating with high differential pressure difference, for the manufacturing of such electrodes and for the use of such electrodes in such cells.

The process of electrolysis has been known for a long time, in the course of which process gas can be developed or metal precipitation can be generated from a material of the right chemical composition with the use of electric current. For example, in the presence of the right electrolyte hydrogen gas and oxygen gas can be generated from water with electrolysis on suitable electrodes.

Two electrodes and at least one electrolyte are needed for electrolysis. The electrodes are connected to the electrolyte. The electrolyte is a conducting ionic solution or some other fluid material or solid material. In the course of the process of electrolysis electron transfer takes place, as a result of which the oxidation state of the participating materials changes. The chemical material accepting the electron is reduced, while the chemical material transferring the electron is oxidised. The anode is the electrode on which oxidation takes place, while the cathode is the electrode on which reduction takes place. (Although, by electrode they often mean only the surface on which the chemical reaction takes place, in the present specification the definition of electrode includes this surface, the material carrying this surface and, in a given case, other structural elements needed to hold together the carrying agent.) As a result of the electric voltage between the ends of the anode and cathode beyond the electrolyte electric current flows through the system, namely on the anode electron transfer, that is oxidation takes place due to the voltage, the electrons released in this way are transmitted by the anode onto the cathode, where reduction takes place as a result of the excess electrons. Electrolysis takes place in the electrolytic cell.

If a reversed process takes place as compared to electrolysis, that is if hydrogen gas and oxygen gas react to each other on the electrodes and in the course of this electric current is produced, then it is called fuel cell.

By fuel cell, we mean a device or equipment, which makes given combustible materials and oxidising materials react to each other, and as a result of this process electric potential difference is generated on the elements of the device (equipment) designed for this purpose. So in the cell, as a result of controlled electrochemical oxidation, the primary energy content of the fuel generates electric current directly, and at the same time thermal energy is released. As compared to traditional elements generating direct current, the fuel cell operates as long as fuel supply is ensured. By inserting an inverter, alternating current can also be generated with a fuel cell.

The basic unit of the fuel cell consists of two electrodes and an electrolyte. During its operation hydrogen reacts on the anode and oxygen on the cathode. With the help of a catalytic agent the hydrogen molecules break up into protons and electrons, the protons flow through the electrolyte, while the electrons flow through the electrodes. The electric current generated in this way can be used to supply electric consumers. With the help of the catalytic agent, the electrons arriving at the cathode combine with the protons and with the oxygen molecules creating water as a final product by this.

Fuel cells are also used in the latest developments of motor-car industry and space research. One of their numerous advantages is that they do not contain any moving parts, they are insensitive to gravitation effects, cosmic radiation, heat fluctuation, they are reliable, stable, their hydrogen and oxygen fuel has a low weight and low volume, and during their operation no harmful materials are emitted. (SZÜCS, Miklós: A tüzelőanyag-cellák várható szerepe az energiaszolgáltatásban [Expected Role of Fuel Cells in Energy Supply], Energiagazdálkodás [Energy Management] 2002/4).

Electrolysis cells and fuel cells together are referred to as electrochemical cells. Several electrochemical cells form an electrochemical cell system, and the materials or electric current generated by it together form the production of the electrochemical cell system.

Among the numerous possibilities of the practical use of electrolysis, it is important to emphasise the procedures and equipment relating to the generation of hydrogen gas, as numerous industrial uses—especially in the chemical industry—of this gas of a simple chemical composition are known, with special respect to wide-ranging technological reactions in organic chemistry, for example in pharmaceutical industry (R. M. Machado, K. R. Heier, R. R. Broekhuis, Curr. Opin. Drug Discov. Dev., 4:745, 2001). In these industrial branches hydrogen gas is commonly used, typically in the course of so-called hydrogenation reactions. For example during the productive activity of a typical pharmaceutical factory, about 10-20% of all synthesis reactions performed are hydrogenation reactions (F. Roessler, Chimia, 50:106, 1996). During hydrogenation hydrogen atom is incorporated into a given organic molecule with the help of a suitable material, such as platinum. The highest the pressure is at which the reaction is realised, the more efficient the output of the hydrogenation reaction is. Numerous solutions have been elaborated for producing high-pressure hydrogen gas. In a suitable solution containing hydrogen ions (H+), the excess electrons created on the cathode due to the voltage reduce the hydrogen ions, from which hydrogen gas is generated ($H_2$) in this way. The devices used for this are generally called hydrogen cells in special literature. Such a-hydrogen cell ensures the hydrogen supply of the new hydrogenating equipment based on nanotechnology, described in Hungarian patent application No. P0401727, and in international application No. PCT/HU05/00046 made on the basis of it (R. Jones, L. Godorhazy, G. Panka, D. Szalay, G. Dorman, L. Urge and F. Darvas, J. Comb. Chem., ASAP DOI: 10.1021/cc050107o, 2004; R. V. Jones, L. Godorhazy, G. Panka, D. Szalay, L. Urge, F. Darvas, ACS Fall Poster, 2004; C. Spadoni, R. Jones, L. Urge and F. Darvas, Chemistry Today, Drug Discov. Sec., January/February issue, 36-39, 2005).

The general construction of hydrogen cells is characterised by that the function of the electrolyte is fulfilled by a solid or gel-like electrically conducting membrane. Another function of the membrane is to separate gas spaces. Numerous membranes of this character are known, for example membranes belonging to the family of proton-conducting polymer membranes. In hydrogen cells, in the course of breaking down two water molecules with electrolysis, one oxygen molecule and two hydrogen molecules are created, so on the side where hydrogen gas is created, due to the double amount of material, the gas pressure is twice as much as on the side where oxygen gas is created. So the difference occurring between the amounts of gases generated in the course of electrolysis results in significant pressure difference on the two sides on the membrane. Electrochemical cells are typically characterised by high gas pressure and high gas pressure difference. The differential pressure difference in the title of the present specification relates to the pressure difference occurring in respect of the gases generated in the space of the two electrodes on the one part, and the high pressure difference occurring between the internal space of the cell and the external space.

The electrodes of a porous construction, made of a conducting material are pressed against the membrane of the hydrogen cell on two sides. The primary function of the electrodes is to conduct electric current to the membrane, so it is important that they are electrically conducting and that they ensure efficient electric contact with the surface of the membrane. Furthermore, the porosity of the electrodes makes it possible to conduct water to the membrane and permit the outflow of the generated gases. The electrodes must be mechanically stable to stand the high pressure caused by the generated gases. Also the material of the electrodes must be chemically resistant to oxygen on the side where oxygen gas is generated. The electrodes contain a catalytic agent on a carrier, such as platinum, palladium, graphite, organic metal complexes, etc. As the electrodes must be resistant to numerous environmental effects, several inventions are known relating to electrodes that can be used in electrochemical cells.

For example, in U.S. Pat. No. 6,828,056 an electrode construction is described, the carrier of which does not become oxidised between voltage values of 1.5 and 4 V in the case of anode function, the carrier contains diamond and a proton conducting material integrated with a catalytic agent.

Typically, apart from the membrane and the electrodes the hydrogen cells also contain water inflow joint and outflow joint, hydrogen gas outflow and electric connections. In hydrogen cells where the water inflow is on the anode side, water—the basic component of electrolysis—enters on the anode side, that is on the side where oxygen gas is generated, and the oxygen gas generated, together with some of the water, is discharged on the same side. The protons and the rest of the water flow through the proton exchange membrane and get in contact with the cathode, where hydrogen gas is generated. Hydrogen cells, where the water inflow is on the cathode side, analogous to hydrogen cells, where the water inflow is on the anode side, are also known.

One of the objectives of the development of hydrogen cells is to break the technological limits restricting pressure increase. Due to the porosity of the electrodes, in actual fact the membrane pressing against the surface of the electrode lies on a knobbed surface. The higher the gas pressure difference is in the cell, the higher pressure differences occur on the one side of the membrane between the surface elements of the membrane above the pores and the surface elements in contact with the solid particle of the electrode. As the amount of gas ($H_2$) generated on the cathode is twice as much as the amount of gas ($O_2$) generated on the anode, the gas pressure on the cathode side presses the membrane against the anode. Consequently the uneven pressure distribution on the membrane is due to the knobbed characteristic of the surface of the anode. In a given construction, above a certain pressure value the membrane may burst because of the uneven pressure distribution, which results in the failure of the cell. Consequently, the electrode used in a hydrogen cell (at least the anode) must have a surface and structural construction with which the damage of the membrane can be prevented in the case of mechanical overload, such as the bursting or indentation, etc. of the membrane.

The probability of the bursting of the membranes can be reduced by reducing the average pore size determining porosity, as a result of which the surface of the electrode becomes more uniform and so the membrane remains more resistant to higher pressures too. However, by reducing the average pore size, the material flow through the electrode is also reduced because of the narrower flow routes, which reduces the efficiency of the cell. For this reason the porosity value is generally between 40 and 70% by volume in the case of the presently known electrodes.

It is also necessary to define the exact suitable thickness of the electrodes, as an electrode that is too thin may become deformed or it may even break as a result of the mechanical load caused by the great pressures occurring in the course of operation. However, an electrode that is too thick reduces the efficiency of the material flow inside it.

As a result of the above, the determination of the average pore size and thickness of the electrodes requires thorough consideration.

Another possible way of increasing the stability of the membrane is the internal fibre-reinforcement of the membrane. The disadvantage of this is that the use of fibres results in the uneven distribution of the thickness of the membrane, which may burst because of this above certain pressure values due to the above causes.

USA patent application No. US20040105773 describes an electrochemical cell, in which the pressure difference occurring in the course of operation is above 2.000 psi (about 14 MPa, 140 bar). Porous electrode produced by sintering is used in the cell. A catalytic agent adsorbed onto the porous electrode or applied onto a porous carrier is in contact with the electrolyte membrane. Here, in the course of producing the electrode—the average pore size of which is between about 2 and 13 micrometers ($2\text{-}13\times10^{-6}$ m)—the catalytic agent is infiltrated into a carrier the porosity of which is above 10%.

The task to be solved with the present invention is to provide an electrode for an electrochemical cell, which electrode is able to press against the membrane even during the occurrence of high pressures, in a way that there is no risk of bursting or damaging the membrane in any other way, and at the same time the electrode also ensures material flow needed for efficient operation. Furthermore, the task to be solved with the invention is to provide a procedure for manufacturing such electrodes and to provide electrochemical cells containing such electrodes.

The invention is based on the recognition that if the electrodes are constructed from several layers with different average pore sizes, then the layer with a smaller average pore size in contact with the membrane presses against the membrane safely even in the case of higher pressures due to its more uniform surface, and the layer or layers with a greater average pore size ensure appropriate stability for the electrode in the case of mechanical effects deriving from high pressures. In this construction appropriate material flow is ensured by that in the layer or layers with a greater average pore size fluids and gases can flow easily, and the layer with a small average pore size, that is the layer highly resistant from the aspect of material flow, must be thin to enable gases and fluids flow through it easily.

On the basis of the above recognition, in accordance with the invention the set task was solved with a porous electrode used in an electrochemical cell and containing a carrier and/or catalytic agent, which electrode consists of two or more layers with different average pore sizes, and out of these layers the layer with the smallest average pore size is in contact with the membrane pressing against it (i.e. the contact layer), and one or more supporting layers with a greater average pore size are connected to the other side of the contact layer.

In the present specification, contact layer shall mean the carrying layer in contact with the membrane, and supporting layer shall mean the layer in contact with either the other side of the contact layer as compared to the membrane or with another supporting layer in a given electrode.

Preferably, the electrode according to the invention consists of a contact layer with a small average pore size and a supporting layer with a greater average pore size.

According to a preferred embodiment of the electrode according to the invention the contact layer is formed by a layer consisting of nanoparticles, or a further layer consisting of nanoparticles is formed on the contact layer.

According to another preferred embodiment of the invention the layer consisting of nanoparticles contains platinum and/or palladium.

According to a preferred embodiment the layers with different average pore sizes are surrounded by a holding unit preferably made of plastic, more preferably made of chemically resistant plastic. Preferably the holding unit is formed in the shape of a ring, more preferably a ring-shaped unit with a groove on its internal side.

The carrier of the electrode according to the invention is an electrically conducting material, which may be metal or graphite, preferably nickel, cobalt, titanium, zirconium, hafnium, niobium, wolfram, iron, platinum or graphite. In the case of constructing an electrode on the oxygen side, the use of iron and nickel may be unfavourable because of the oxidation effect. Most preferably the carrier of the electrode according to the invention is made of titanium.

The surface of the electrode according to the invention in contact with the membrane is coated with one of the catalytic agents generally used in electrochemical cells. Catalytic agents used in electrochemical cells are known by persons skilled in the art, so here we mention platinum, rhodium and palladium as examples, as possible catalytic agents on the hydrogen side. Catalytic agents used on the side where oxygen is generated may be platinum, osmium, rhodium or iridium, preferably platinum or iridium, more preferably iridium.

According to a preferred embodiment the average pore size of the contact layer of the electrode is between 0.5 and 30 μm ($5 \times 10^{-7}$ m-$3 \times 10^{-5}$ m), preferably between 1.0 and 10 μm ($1 \times 10^{-6}$ m -$1 \times 10^{-5}$ m), most preferably between 1.5 and 2.5 μm ($1.5 \times 10^{-6}$ m-$2.5 \times 10^{-6}$ m), and the average pore size of its supporting layer or supporting layers is between 30 and 800 μm ($3 \times 10^{-8}$ m-$8 \times 10^{-4}$ m), preferably between 50 and 500 μm ($5 \times 10^{-5}$ m -$5 \times 10^{-4}$ m), most preferably between 100 and 300 μm ($1 \times 10^{-4}$ m-$3 \times 10^{-4}$ m). If the contact layer consists of nanoparticles, the particle size and also pore size of the contact layer is within the nanometer range. The particle size and also pore size of the optional further layer consisting of nanoparticles and formed on the contact layer is within the nanometer range.

The invention also relates to a procedure for manufacturing electrodes by pressing, according to which
in a given case the sponge and/or granules and/or fibrous material serving as the base material of the carrier is divided into two or more fractions on the basis of the average particle size or average diameter; and
the individual fractions are layered on top of each other in the pressing tool in accordance with the number of the planned layers, and then they are cold-pressed or sintered.

According to a preferable embodiment of the procedure, a holding unit is placed in the pressing tool before layering the sponge fractions, granule fractions or fibrous fractions on top of each other.

According to another embodiment a channel or channels are pressed in the supporting layer of the electrode.

According to a further preferred embodiment a layer consisting of nanoparticles is formed on one or more pressed or sintered layers.

The catalytic agent is applied after cold-pressing or sintering, using one of the known state-of-the-art procedures.

The present invention also relates to an electrochemical cell, which consists at least of a membrane, electrodes, electric connections and a house surrounding all these, and this cell is characterised by that at least one of the electrodes consists of two or more layers with different average pore sizes.

According to a preferred embodiment the electrochemical cell forms a part of an electrochemical cell system.

According to another preferred embodiment the electrochemical cell is for generating hydrogen gas and/or oxygen gas.

The electrode according to the invention consists at least of a carrier and a catalytic agent applied onto it. The carrier, the catalytic agent, the application of the catalytic agent onto the carrier are all known according to the state of the art. Preferably the carrier and the catalytic agent together are surrounded by a holding unit.

The carrier may be made of sponge, granules, powder and/or fibres by sintering or cold-pressing. The layers of the electrodes according to the invention are produced preferably from sponge or granules, more preferably from sponge, by cold-pressing.

The electrode according to the present invention can be used for example in electrochemical cells for the generation of hydrogen gas or in cell systems constructed from such cells, where preferably the carrier of the electrode (cathode) for the generation of hydrogen gas is for example nickel, cobalt, titanium, zirconium, hafnium, niobium, wolfram, iron, platinum or graphite, more preferably titanium, and preferably the catalytic agent is for example platinum, palladium or rhodium. Furthermore, preferably the carrier of the electrode (anode) for the generation of oxygen gas is for example cobalt, titanium, zirconium, hafnium, niobium, wolfram, platinum or graphite, more preferably titanium, and preferably the catalytic agent is for example iridium or osmium, especially favourably iridium.

The electrode according to the invention consists of layers with different average pore sizes, namely a contact layer, which is in contact with the membrane, and one or more supporting layers ensuring stability. The value of the average pore size is expressed in μm. The average pore size of the contact layer of the electrode is between 0.5 and 30 μm ($5 \times 10^{-7}$ m-$3 \times 10^{-5}$ m), preferably between 1.0 and 10 μm ($1 \times 10^{-6}$ m-$1 \times 10^{-5}$ m), most preferably between 1.5 and 2.5 μm ($1.5 \times 10^{-6}$ m-$2.5 \times 10^{-6}$ m), and the average pore size of the one or more supporting layers is between 30 and 800 μm ($3 \times 10^{-8}$ m-$8 \times 10^{-4}$ m), preferably between 50 and 500 μm ($5 \times 10^{-5}$ m-$5 \times 10^{-4}$ m), most preferably between 100 and 300 μm ($1 \times 10^{-4}$ m-$3 \times 10^{-4}$ m). If more supporting layers are used, they may have different average pore sizes. The thickness of the contact layer may be between 0.1-2.0 mm ($1 \times 10^{-4}$ m-$2 \times 10^{-3}$ m), preferably between 0.3-1.0 mm ($3 \times 10^{-4}$ m-$1 \times 10^{-3}$ m), more preferably 0.5 mm ($5 \times 10^{-4}$ m). The thickness of the supporting layers depends on the number of supporting layers. In the case of using one supporting layer, its thickness is generally between 1.2-1.5 mm ($1.2 \times 10^{-3}$ m-$1.5 \times 10^{-3}$ m).

Preferably a catalytic layer consisting of nanoparticles is formed as or on the contact layer of the electrode according to the invention, for example using platinum and/or palladium. The nanoparticles are within the nanometer range, as a result of which they form a large specific surface making the electrochemical reaction even more efficient. Although in this way, the actual contact layer is a layer with a particle size within the nanoparticle range, its mechanical stability is negligible, so in order to use clear definitions, in the present specification contact layer shall mean the layer defined above.

The average pore size of the layers is influenced by the average particle size of the granules or the average diameter of the fibres making up the individual layers. Typically the average particle size of the contact layer is between 50-200 µm ($5 \times 10^{-5}$ m - $2 \times 10^{-4}$ m). Typically the average particle size of the supporting layers is between 350-800 µm ($3.5 \times 10^{-4}$ m - $8 \times 10^{-4}$ m). The individual layers may consist of granules, or fibres, or even a mixture of granules and fibres. For technological reasons, these fibres may not be too long, so the favourable value of their diagonal is close to the arithmetical average obtained from their length and thickness, which value, in the case of using granules, is similar to their average grain size.

There is a clear relation between the average pore size and the average particle size used. The greater the average particle size used for manufacturing the electrode is, the greater the average pore size of the electrode is.

In the case of the procedure used for manufacturing electrodes according to the invention, preferably the electrodes are constructed as discs, by pressing sponge the base material of which is metal or graphite, preferably nickel, cobalt, titanium, zirconium, hafnium, niobium, wolfram, iron, platinum or graphite, most preferably titanium, preferably into a plastic holding unit at a high pressure. According to another preferred embodiment, instead of using the sponge of the materials listed above the pressing operation is performed using their granules.

The present invention also relates to an electrochemical cell or cell system, in which the electrode according to the invention is used at least on the side where there is lower pressure. The electrodes according to the invention can be used in high-pressure electrochemical cells with which electrolysis can be performed for gas generation, or which may function as fuel cells operated with the use of gases. The electrochemical cell or electrochemical cell system according to the present invention is an electrolysis cell or cell system preferably generating hydrogen and/or oxygen, or a fuel cell or cell system operating with gas mixture containing hydrogen and oxygen. Most preferably the electrochemical cell or cell system according to the present invention is a hydrogen cell.

Figure 2:
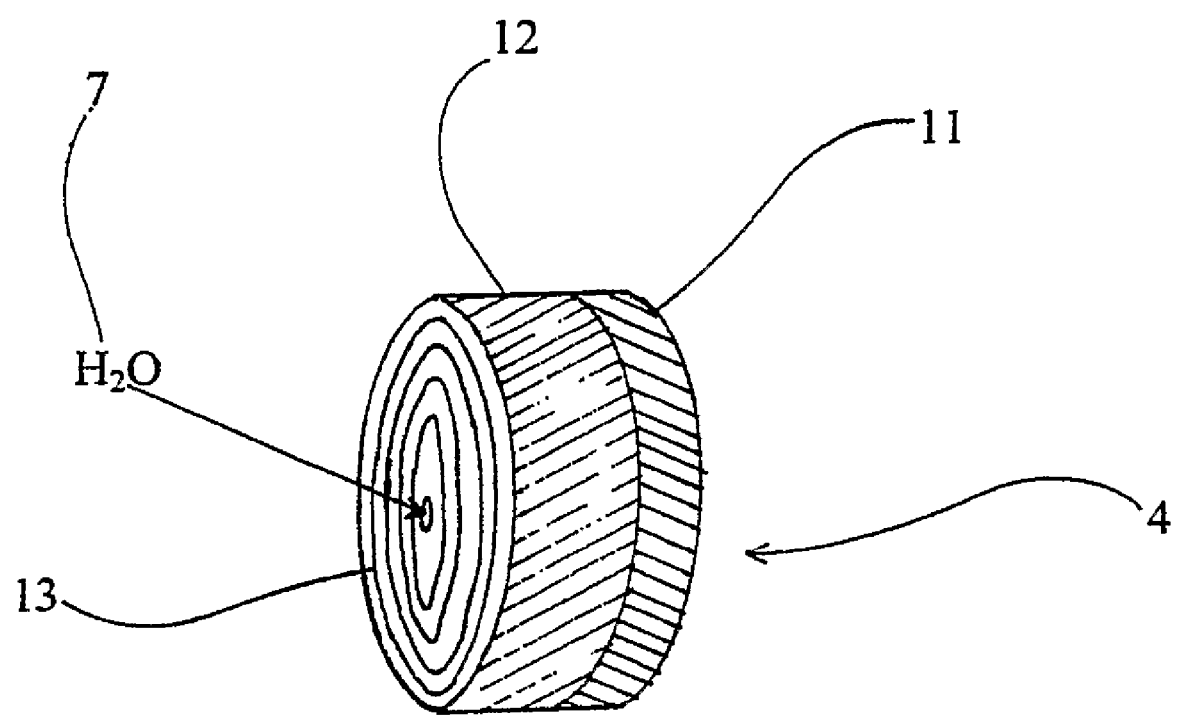
Figure 3:
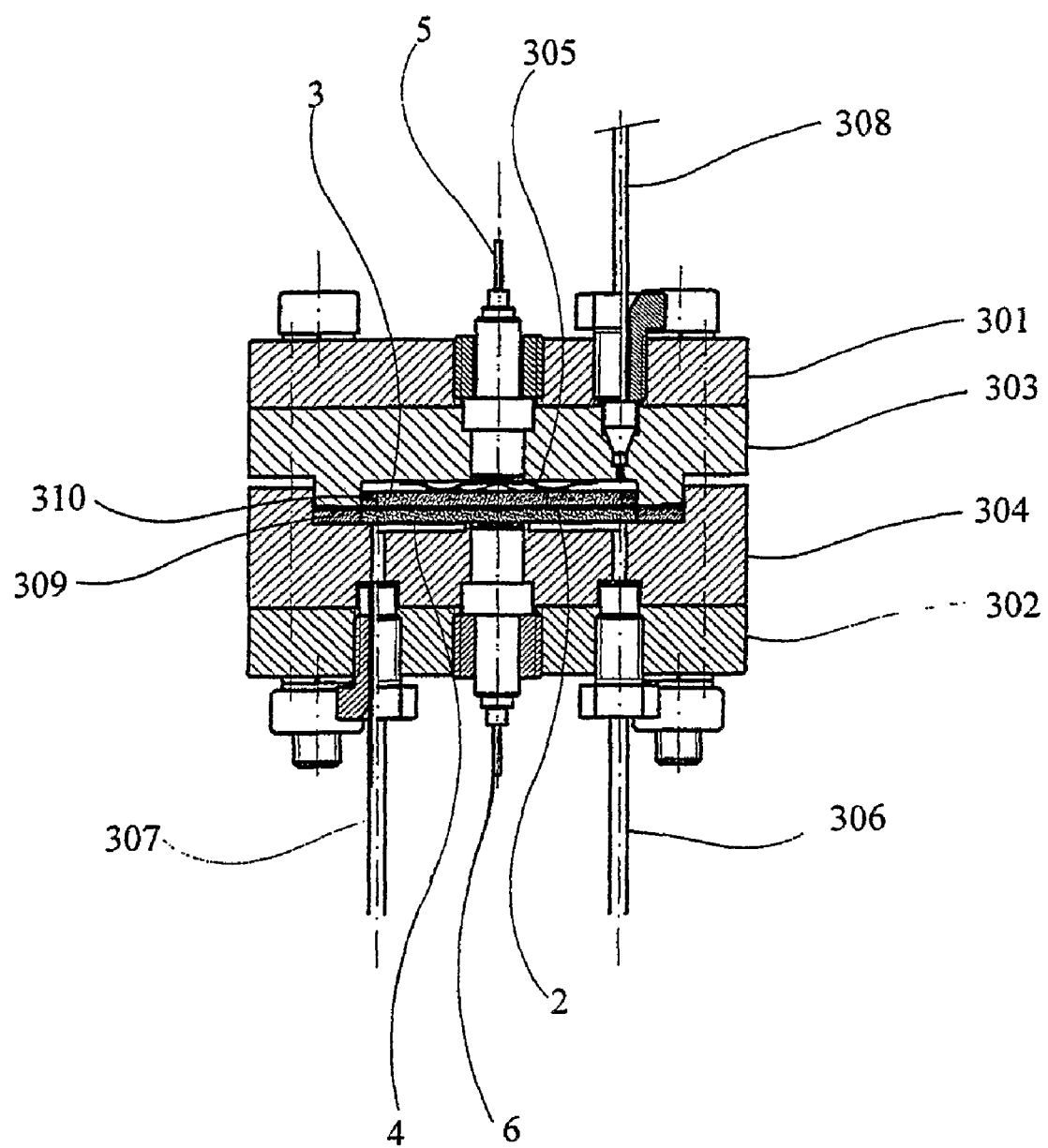

Below the invention is described in detail with the help of the attached drawings. In the drawings FIG. 1 shows the membrane-electrode unit of a hydrogen cell with water input on the anode side, in diagrammatic cross-section;

FIG. 2 shows the structure of an electrode as an example, in detail, in perspective view; and FIG. 3 shows an electrochemical cell in section.

FIG. 1 shows the membrane-electrode unit—marked with reference number 1 as a whole—of a hydrogen cell with water input on the anode side, in side view, which unit consists of a proton conducting membrane 2, a cathode 3, an anode 4 and electric connectors 5 and 6.

If electric direct voltage is generated between the electric connectors 5, 6 in the right direction, the water 7 deriving from the water input undergoes electrochemical decomposition, as a result of which oxygen gas 9 is generated on the anode 4, and hydrogen gas 10 is generated on the cathode 3 due to the protons and water flowing through the membrane 2. The water 8 and oxygen gas 9 remaining on the anode side leave the anode 4 together.

FIG. 2 shows a preferred embodiment of the electrode according to the invention. (In the interest of better comprehensibility the holding unit surrounding the contact layer 11 and the supporting layer 12 are not shown in the figure.) In the figure the disc-shaped anode marked with reference number 4 as a whole consists of a contact layer 11 in contact with the membrane (not shown) and a supporting layer 12. The contact layer 11 is in contact with the membrane. The supporting layer 12 has a channel 13 consisting of concentric circles, which channel 13 ensures the even distribution of the input water 7 on the electrode 4. The unit ensuring water input (not shown) connected to the supporting layer 12 contains radial channels to enable the input water to flow from them easily into the channels forming concentric circles on the supporting element 12.

FIG. 3 shows a preferable embodiment of the hydrogen cell according to the invention. The house of the hydrogen cell comprises a plastic upper chamber 303 and a plastic lower chamber 304 pressed together by a steel upper pressure plate 301 and a steel lower pressure plate 302. The chambers are made of plastic to ensure chemical resistance to oxygen. The upper pressure plate 301 and the lower pressure plate 302 are pushed towards each other by steel screws (not shown), and in the end they press together the upper chamber 303 and the lower chamber 304. In the space between the two chambers there is a membrane 2 caught between the anode 4 and the cathode 3. The cathode 3 is pressed to the membrane 2 by titanium springs 305. The pressure plates 301 and 302 carry the electric connections, and gas and water joints. The water joints 306 and 307 ensure water input and water discharge. The generated hydrogen gas is discharged from the hydrogen cell through a pipe 308. The electric connections 5 and 6 ensure electric current supply needed for the electrolysis. The electric connections are sealed against hydrogen gas pressure and they have a springy construction to overcome dimension changes caused by temperature changes. In the figure the layers of electrodes 3 and 4 are shown as one single unit in the interest of better comprehensibility, but it is emphasised that—in accordance with the present invention—these electrodes, but at least the anode 4, consist of several layers with different average pore sizes. The electrodes are surrounded by plastic holding units 309 and 310.

If electric direct voltage is generated between electric connections 5 and 6 in the right direction, the distilled water entered through the water joint 306 undergoes electrochemical decomposition on the anode 4, as a result of which oxygen gas is generated here, and due to the protons and water flowing through the membrane 2 hydrogen gas is generated on the cathode 3, which is then directed to its place of use or storage through the pipe 308.

For example, if the electrode according to the invention is used for the generation of hydrogen gas and oxygen gas by water decomposition in an electrolysis cell, then the electrode on the oxygen side (anode) that can be used contains, for example, iridium catalytic agent on a titanium carrier pressed into a plastic holding unit, the carrier consists of a 0.5 mm ($5 \times 10^{-4}$ m) thick contact layer with an average pore size of 2 µm ($2 \times 10^{-6}$ m) and a 1.2-1.5 mm ($1.2 \times 10^{-3}$ m-$1.5 \times 10^{-3}$ m) thick supporting layer with an average pore size of 200 µm ($2 \times 10^{-4}$ m).

For example, if the electrode according to the invention is used for the generation of hydrogen gas and oxygen gas by water decomposition in an electrolysis cell, then the electrode on the oxygen side (anode) can be manufactured for example with the following procedure.

The manufacturing of the $O_2$ electrode takes place through the following steps:

1. O₂ frit pressing
2. cleaning, checking
3. assembly

1. O₂-Side Titanium Frit Pressing

In fact, it is a frit consisting of two layers. On the ribbed side, 4.5 g of coarse-grained titanium powder (particle size: 400-1000 µm; ($4\times10^{-4}$ m-$1\times10^{-3}$ m)) is used, while on the side in contact with the membrane 0.5 g of fine-grained titanium powder (particle size: below 400 µm; (below $4\times10^{-4}$ m)) is used, so that their total weight is: 5.0 g.

The process of pressing:

The surfaces of the tools getting in contact with titanium are cleaned with artificial cotton dipped in alcohol or with 10% HCl solution, rinsed with distilled water and dried quickly.

The prefabricated plastic ring is placed on the lower part of the pressing tool. Then the coarse-grained titanium powder is poured into the tool evenly, and the powder is spread gently with a suitable tool. Then the mixture is distributed while holding the tool horizontally and rotating it.

The pressing bar is placed into the tool and the titanium powder is pressed. After the operation, the pressing bar is removed from the tool. In the next step, the fine-grained titanium powder is poured into the pressing tool and spread. After distribution, the pressing insert is placed into the upper part of the tool and the titanium powder is pressed.

The tool is placed in the press and it is pressed with a weight of 10 tons ($1\times10^7$ g). The press is opened, the tool is taken out. The tool is disassembled, and the pressed frit is knocked out of the tool. After pressing, the pressed frit and the pressing tool are cleaned with compressed air.

2. Cleaning, Checking:

The pressed frit is soaked in ethanol for 15 minutes, then dried. Any possible titanium particle are removed from both sides of the frit and the smoothness of the surface is checked.

3. Assembly:

The O₂ frit is placed on artificial cotton with its smooth size facing upwards. 500 µl ($5\times10^{-4}$ l) of iridium suspension (80 mg/ml) is pressed on the titanium part of the frit. The previous operation is repeated with further 500 µl ($5\times10^{-4}$ l) of such iridium suspension, then it is dried. The electrodes coated with iridium are pressed on their suspension side with a hydraulic press, with 2 tons ($2\times10^6$ g).

If a catalytic layer consisting of nanoparticles is to be applied on the electrode according to the invention, it can be realised as follows. Platinum nanoparticles with a well-defined particle size and morphology are produced using a known state-of-the-art method, for example from the methanol/water solution of $H_2PtCl_6$, in the presence of polyvinyl pyrrolidone (PVP) stabilising agent, in a heated reactor space. The porous titanium frit is pre-heated to a temperature of 50-70° C., and a few ml-s of the previously prepared colloid solution containing platinum particles are applied onto the contact layer of the frit. After applying the solution, the solvent evaporates leaving the platinum nanoparticles behind. In this way, a platinum nanoparticle layer of a particle size of 2-3 nm can be created on the surface of the electrode.

If according to a preferred embodiment of the electrochemical cell forming the object of the present invention, the electrochemical cell is a hydrogen cell, the electrode of which on the oxygen side (anode) consists of a 0.5 mm thick ($5\times10^{-4}$ m) contact layer with an average pore size of 2 µm ($2\times10^{-6}$ m) and a 1.2-1.5 mm thick ($1.2\times10^{-3}$ m-$1.5\times10^{-3}$ m) supporting layer with an average pore size of 200 µm ($2\times10^{-4}$ m), which layers are cold-pressed into a plastic ring to produce the electrode, then the operating hydrogen-pressure of the hydrogen cell can even be as much as 35 MPa (about 350 bar). Choosing the right membrane is a condition of reaching higher operating hydrogen-pressure. When using the membrane chosen by us (a membrane by Dupont with the brand name Nafion™), in the case of high hydrogen pressure the hydrogen generated on the cathode side diffuses over onto the anode side. With the use of the electrochemical cell construction, forming the subject of the present invention operating hydrogen pressure equivalent to 60 MPa (600 bar) can be reached. The theoretical pressure resistance of the electrode on the oxygen side (anode) manufactured as above, which pressure resistance can be generally calculated from the pressing force and the surface of the anode (pressing force divided by the surface), may even be as much as 300 MPa (about 3000 bar).

The electrode forming the object of the present invention, its manufacturing and the electrochemical cell using it are obviously not restricted to the construction examples shown in the figures, but the scope of protection relates to the electrode specified in the claims, its manufacturing and its use in an electrochemical cell.

Furthermore, it is emphasised that although in the specification we mostly refer to a hydrogen cell as one of the most commonly used electrochemical cells, the electrode according to the present invention, its manufacturing and the electrochemical cell using it can be used in the case of any high-pressure electrolysis cell or fuel cell with a membrane, as it is obvious for a person skilled in the art.

The invention claimed is:

1. Procedure for manufacturing an electrolysis cell having a porous electrode containing a carrier and/or catalytic agent and an electrolyte in the form of a membrane in contact with the electrode which comprises at least the following steps:
    dividing sponge and/or granules and/or fibrous material serving as the base material of the carrier into two or more portions on the basis of the average particle size or average diameter;
    layering individual portions on top of each other in a pressing tool;
    cold-pressing the layers in the pressing tool to produce a contact layer constituted by a portion having smallest average particle size or average diameter; and
    assembling the porous electrode in the electrolysis cell so that the contact layer is in contact with the membrane.

2. Procedure according to claim 1, characterized by that a holding unit—preferably made of plastic—, preferably a ring (309, 310), is placed in the pressing tool before layering sponge material granules, or fibrous material on top of each other.

3. Procedure according to claim 1 wherein channels (13) are pressed in the supporting layer (12) of the electrode (4).

4. Procedure according to claim 1 wherein a layer of nanoparticles is deposited on one or more of the layered individual portions.

* * * * *